United States Patent
Guerin et al.

(10) Patent No.: US 7,235,601 B2
(45) Date of Patent: *Jun. 26, 2007

(54) HYDROGENATED NITRILE RUBBER COMPOSITIONS WITH IMPROVED PROCESSABILITY

(75) Inventors: Frederic Guerin, Petrolia (CA); Ezio Campomizzi, Sarnia (CA); Lorenzo Ferrari, Bright's Grove (CA); Janet Gamlin, Sewickley, PA (US); Richard Pazur, Sarnia (CA); Carl Walter von Hellens, Bright's Grove (CA)

(73) Assignee: Lanxess Inc., Sarnia, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/684,601

(22) Filed: Oct. 14, 2003

(65) Prior Publication Data
US 2004/0110888 A1    Jun. 10, 2004

(30) Foreign Application Priority Data
Oct. 17, 2002    (CA) .................................... 2409429

(51) Int. Cl.
*C08L 9/02*    (2006.01)
*C08F 4/80*    (2006.01)

(52) U.S. Cl. .................. 524/565; 524/566; 525/329.1; 525/329.2; 525/329.3; 525/343; 526/171; 526/341

(58) Field of Classification Search ............... 524/565, 524/566; 525/329.1, 329.3, 387, 343, 329.2; 264/328.2, 328.18; 526/171, 341
See application file for complete search history.

(56) References Cited

U.S. PATENT DOCUMENTS

| | | | |
|---|---|---|---|
| 5,187,232 A | 2/1993 | Musch et al. ............. 525/215 |
| 5,395,891 A * | 3/1995 | Obrecht et al. ............. 525/194 |
| 5,432,226 A * | 7/1995 | Aonuma et al. ............. 524/506 |
| 5,651,995 A * | 7/1997 | Oyama et al. ............. 524/565 |
| 6,187,867 B1 * | 2/2001 | Rau et al. ............. 525/221 |
| 6,489,385 B1 * | 12/2002 | Fujii et al. ............. 524/186 |
| 6,780,939 B2 * | 8/2004 | Guerin et al. ............. 525/329.1 |
| 2003/0171518 A1 | 9/2003 | Magg et al. ............. 526/297 |
| 2004/0113320 A1 * | 6/2004 | Guerin ............. 264/328.2 |
| 2004/0132891 A1 * | 7/2004 | Ong et al. ............. 524/492 |

FOREIGN PATENT DOCUMENTS

| | | |
|---|---|---|
| CA | 2 350 280 | 12/2002 |
| CA | 2 351 961 | 12/2002 |
| CA | 2 357 465 | 3/2003 |
| CA | 2 357 470 | 3/2003 |
| EP | 0 419 952 | 4/1991 |
| EP | 0 972 797 | 3/1998 |
| WO | WO 9736956 A1 * | 10/1997 |

* cited by examiner

Primary Examiner—Vasu Jagannathan
Assistant Examiner—Vickey Ronesi
(74) Attorney, Agent, or Firm—Jennifer R. Seng

(57) ABSTRACT

The present invention relates to polymer composites containing at least one, optionally hydrogenated, nitrile rubber polymer having a Mooney viscosity (ML 1+4 @ 100° C.) in the range of from 50–30 at least one filler and optionally at least one cross-linking agent, a process for preparing said polymer composite wherein at least one, optionally hydrogenated, nitrile rubber polymer having a Mooney viscosity (ML 1+4 @ 100° C.) in the range of from 50–30, at least one filler and optionally at least one cross-linking agent are mixed and a process for the manufacture of a shaped article including the step of injection molding a polymer composite containing at least one, optionally hydrogenated, nitrile rubber polymer having a Mooney viscosity (ML 1+4 @ 100° C.) in the range of from 50-30, at least one filler and at least one cross-linking agent.

7 Claims, 1 Drawing Sheet

HYDROGENATED NITRILE RUBBER COMPOSITIONS WITH IMPROVED PROCESSABILITY

FIELD OF THE INVENTION

The present invention relates to polymer composites containing at least one, optionally hydrogenated, nitrile rubber polymer having a Mooney viscosity (ML 1+4 @ 100° C.) in the range of from 50–30, at least one filler and optionally at least one cross-linking agent, a process for preparing said polymer composite wherein at least one nitrile rubber polymer having a Mooney viscosity (ML 1+4 @ 100° C.) in the range of from 50–30, at least one filler and optionally at least one cross-linking agent are mixed and a process for the manufacture of a shaped article containing the step of injection molding a polymer composite containing at least one nitrile rubber polymer having a Mooney viscosity (ML 1+4 @ 100° C.) in the range of from 50–30, at least one filler and at least one cross-linking agent.

BACKGROUND OF THE INVENTION

Hydrogenated nitrile rubber (HNBR), prepared by the selective hydrogenation of acrylonitrile-butadiene rubber (nitrile rubber; NBR, a copolymer containing at least one conjugated diene, at least one unsaturated nitrile and optionally further comonomers), is a specialty rubber which has very good heat resistance, excellent ozone and chemical resistance, and excellent oil resistance. Coupled with the high level of mechanical properties of the rubber (in particular the high resistance to abrasion) it is not surprising that NBR and HNBR have found widespread use in the automotive (seals, hoses, bearing pads) oil (stators, well head seals, valve plates), electrical (cable sheathing), mechanical engineering (wheels, rollers) and shipbuilding (pipe seals, couplings) industries, amongst others.

Commercially available HNBR has a Mooney viscosity in the range of from 55 to 105, a molecular weight in the range of from 200,000 to 500,000 g/mol, a polydispersity greater than 3.0 and a residual double bond (RDB) content in the range of from 1 to 18% (by IR spectroscopy).

One limitation in processing HNBR is the relatively high Mooney Viscosity. In principle, HNBR having a lower molecular weight and lower Mooney viscosity would have better processability. Attempts have been made to reduce the molecular weight of the polymer by mastication (mechanical breakdown) and by chemical means (for example, using strong acid), but such methods have the disadvantages that they result in the introduction of functional groups (such as carboxylic acid and ester groups) into the polymer, and the altering of the microstructure of the polymer. This results in disadvantageous changes in the properties of the polymer. In addition, these types of approaches, by their very nature, produce polymers having a broad molecular weight distribution.

A hydrogenated nitrite rubber having a low Mooney and improved processability, but which has the same microstructure as those rubbers which are currently available, is difficult to manufacture using current technologies. The hydrogenation of NBR to produce HNBR results in an increase in the Mooney viscosity of the raw polymer. This Mooney Increase Ratio (MIR) is generally around 2, depending upon the polymer grade, hydrogenation level and nature of the feedstock. Furthermore, limitations associated with the production of NBR itself dictate the low viscosity range for the HNBR feedstock. Currently, one of the lowest Mooney viscosity products available is Therban® VP KA 8837 (available from Bayer), which has a Mooney viscosity of 55 (ML 1+4 @ 100° C.) and a RDB of 18%.

Co-pending applications CA-2,351,961, CA-2,357,470, CA 2,350,280 and CA 2,357,465 disclose a low-Mooney HNBR and a method for producing said low-Mooney HNBR. While the disclosed HNBR being perfectly suitable for the present invention, said applications are silent about polymer composites containing said low-Mooney HNBR and methods of producing shaped articles from said low-HNBR.

SUMMARY OF THE INVENTION

The present invention relates to a polymer composite containing at least one, optionally hydrogenated, nitrile rubber polymer ("NBR" or "HNBR" if hydrogenated) having a Mooney viscosity (ML 1+4 @ 100° C.) in the range of from 50–30 and a residual double bond (RDB) content in the range of from 1 to 18% (by IR spectroscopy), at least one filler and optionally at least one cross-linking agent. According to the present invention, the NBR can be fully or partially hydrogenated ("HNBR"). The present invention also relates to polymer composites containing at least one, optionally hydrogenated, nitrile rubber polymer having a Mooney viscosity (ML 1+4 @ 100° C.) in the range of 50–30, of for example, below 45, and further for example, below 40.

The present invention also relates to a process for the manufacture of a shaped article including the step of injection molding a polymer composite containing at least one, optionally hydrogenated, nitrile rubber polymer having a Mooney viscosity (ML 1+4 @ 100° C.) in the range of from 50–30, at least one filler and at least one cross-linking agent.

Further, the present invention relates to a shaped article, such as a seal, hose, bearing pad, stator, well head seal, valve plate, cable sheathing, wheel, roller, pipe seal or footwear component prepared by injection molding and subsequent curing of a polymer composite containing at least one, optionally hydrogenated, nitrile rubber polymer having a Mooney viscosity (ML 1+4 @ 100° C.) in the range of from 50–30, at least one filler and optionally at least one cross-linking agent.

DESCRIPTION OF THE INVENTION

Figure 1:
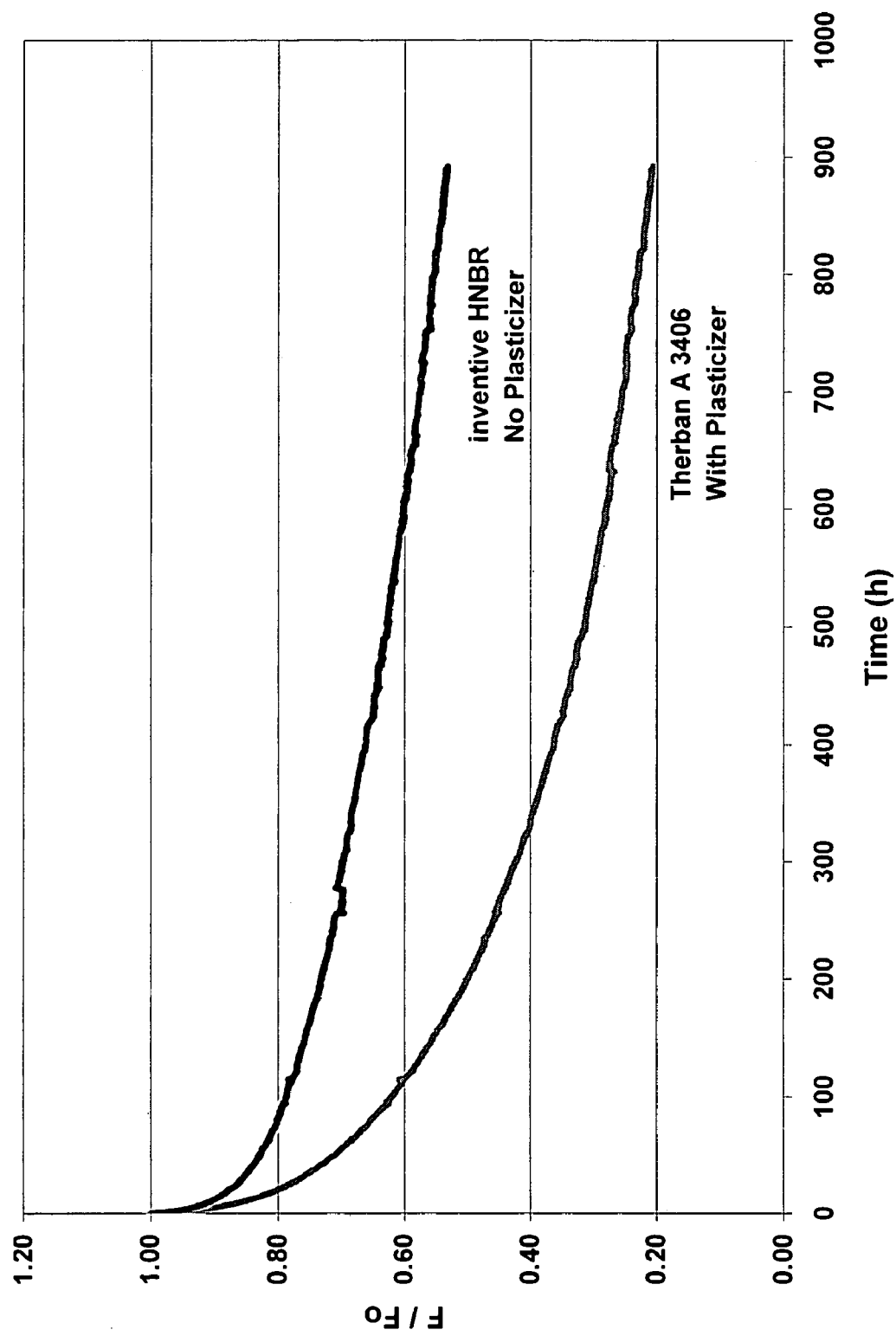
FIG. 1 illustrates lower plasticizer level leads to improved Compressive Stress Relaxation (CSR) which translate to and improved retention of Initial Force.

The present invention will now be described for purposes of illustration and not limitation. Except in the operating examples, or where otherwise indicated, all numbers expressing quantities, percentages, and so forth in the specification are to be understood as being modified in all instances by the term "about." Also, all ranges include any combination of the maximum and minimum points disclosed and include any intermediate ranges therein, which may or may not be specifically enumerated herein.

As used throughout this specification, the term "nitrile polymer" or NBR is intended to have a broad meaning and is meant to encompass a copolymer having repeating units derived from at least one conjugated diene, at least one α,β-unsaturated nitrile and optionally further one or more copolymerizable monomers.

The conjugated diene may be any known conjugated diene, such as a $C_4$–$C_6$ conjugated diene. Useful conjugated dienes include butadiene, isoprene, piperylene, 2,3-dimethyl butadiene and mixtures thereof. For example, the $C_4$–$C_6$ conjugated dienes can be butadiene, isoprene and mixtures thereof. Or, further for example the $C_4$–$C_6$ conjugated diene can be butadiene.

The $\alpha,\beta$-unsaturated nitrile may be any known $\beta,\beta$-unsaturated nitrile, such as a $C_3$–$C_5$ $\alpha,\beta$-unsaturated nitrile. Suitable $C_3$–$C_5$ $\alpha,\beta$-unsaturated nitriles include acrylonitrile, methacrylonitrile, ethacrylonitrile and mixtures thereof. For example, the $C_3$–$C_5$ $\alpha,\beta$-unsaturated nitrile can be acrylonitrile.

According to the present invention, the copolymer contains in the range of from 40 to 85 weight percent of repeating units derived from one or more conjugated dienes and in the range of from 15 to 60 weight percent of repeating units derived from one or more unsaturated nitriles. Also, for example, the copolymer contains in the range of from 60 to 75 weight percent of repeating units derived from one or more conjugated dienes and in the range of from 25 to 40 weight percent of repeating units derived from one or more unsaturated nitriles. Further, for example, the copolymer according to the present invention, contains in the range of from 60 to 70 weight percent of repeating units derived from one or more conjugated dienes and in the range of from 30 to 40 weight percent of repeating units derived from one or more unsaturated nitriles.

Optionally, the copolymer may further comprise repeating units derived from one or more copolymerizable monomers, such as unsaturated carboxylic acids. Non-limiting examples of suitable unsaturated carboxylic acids include fumaric acid, maleic acid, acrylic acid, methacrylic acid and mixtures thereof. Repeating units derived from one or more copolymerizable monomers will replace a portion of either nitrile or the diene monomer of the nitrile rubber and it will be apparent to the skilled in the art that the above mentioned figures will have to be adjusted to result in 100 weight percent. In case of the mentioned unsaturated carboxylic acids, the nitrile rubber contains repeating units derived from one or more unsaturated carboxylic acids in the range of from 1 to 10 weight percent of the rubber, with this amount displacing a corresponding amount of the conjugated diolefin.

Other optionally further monomers useful in the present invention include unsaturated mono- or di-carboxylic acids or derivatives thereof (e.g., esters, amides and the like) including mixtures thereof.

Hydrogenated in the present invention is understood to mean that at least 50% of the residual double bonds (RDB) present in the starting nitrile polymer/NBR being hydrogenated, or for example, more than 90% of the RDB are hydrogenated, or, further for example, more than 95% of the RDB are hydrogenated and also, for example, more than 99% of the RDB are hydrogenated.

The Mooney viscosity of the rubber according to the present was determined using ASTM test D1646.

The present inventive polymer composite comprises at least one HNBR having a Mooney viscosity (ML 1+4 @ 100° C. according to ASTM test D1646) of in the range of from 50–30, or for example, in the range of from 45–30, and further for example, in the range of from 40–30.

The low-Mooney, optionally hydrogenated NBR of the present invention has a polydispersity index of less than 3, or, for example, less than 2.9, or less than 2.8, or less than 2.7, or less than 2.6, or less than 2.5, or, further for example, less than 2.4, or less than 2.3, or less than 2.2.

The present invention is not restricted to a special process for preparing the, optionally hydrogenated, NBR. However, the NBR and HNBR of the present invention is readily available in a two step synthesis as disclosed in CA-2,351, 961, CA-2,357,470, CA 2,350,280 and CA 2,357,465, which may take place in the same reaction set-up or different reactors. For jurisdictions allowing for this procedure, CA-2, 351,961, CA-2,357,470, CA 2,350,280 and CA 2,357,465 are incorporated herein by reference.

Step 1: Metathesis

The metathesis reaction is conducted in the presence of one or more compounds of the general formulas I, II, III or IV;

Formula I wherein:

M is Os or Ru,

R and $R^1$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, X and $X^1$ are independently any anionic ligand, and L and $L^1$ are independently any neutral ligand, such as phosphines, amines, thioethers or imidazolidinylidene (which are especially preferred) or any neutral carbene, optionally, L and $L^1$ can be linked to one another to from a bidentate neutral ligand;

$$\left[ \begin{matrix} L^2 \\ | \\ X^2 / M^1 = C = C \underset{n}{=} C \\ | \\ L^3 \end{matrix} \begin{matrix} R^2 \\ / \\ \\ \backslash \\ R^3 \end{matrix} \right]^{\oplus} \quad Y^{\ominus}$$

Formula II wherein:

$M^1$ is Os or Ru;

$R^2$ and $R^3$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, $X^2$ is a anionic ligand, and $L^2$ is a neutral π-bonded ligand, independent of whether they are mono- or polycyclic, $L^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxylcarbonylalkyl-, hydrocycarbonylalkyl-, hydroxyalkyl- or ketoalkyl-groups, phosphites, phosphinites, phosphonites, phosphinamines, arsines, stibenes, ethers, amines, amides, imines, sulfoxides, thioethers and pyridines, Y—is a non-coordinating anion, n is an integer in the range of from 0 to 5;

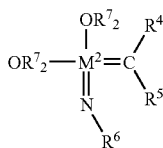

Formula III wherein

M² is Mo or W,

R⁴ and R⁵ are, independently, hydrogen or a hydrocarbon selected from the group consisting of $C_2$–$C^{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkenyloxy, aryloxy, $C_2$–$C_{20}$ alkoxycarbonyl, $C_1$$C_{20}$ alkylthio, $C_1$–$C_{20}$ alkylsulfonyl and $C_1$–$C_{20}$ alkylsulfinyl, R⁶ and R⁷ are independently selected from any unsubstituted or halo-substituted alkyl, aryl, aralkyl groups or silicon-containing analogs thereof:

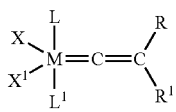

Formula IV wherein:

M is Os or Ru,

R and R¹ are independently selected from the group consisting of hydrogen, substituted or unsubstituted alkyl, and substituted or unsubstituted alkyl, X and X¹ are independently any anionic ligand, and L and L¹ are independently any neutral ligand, such as phosphines, amines, thioethers or imidazolidinylidene (which are especially preferred) or any neutral carbene, optionally, L and L¹ can be linked to one another to from a bidentate neutral ligand.

According to the present invention, the compound can be of Formula I. Further, for example, the compound can be of Formula I wherein L and L¹ are trialkylphosphines or imidazolidinylidene, X and X¹ are chloride ions and M is Ruthenium.

The amount of compounds will depend upon the nature and catalytic activity of the compound(s) in question. Typically, the ratio of compound(s) to NBR is in the range of from 0.005 to 5, or, for example, in the range of from 0.025 to 1 and, further for example, in the range of from 0.1 to 0.5.

The metathesis reaction is carried out in the presence of a co-olefin which can be a $C_2$ to $C_{16}$ linear or branched olefin such as ethylene, isobutene, styrene or 1-hexene. Where the co-olefin is a liquid (such as 1-hexene), the amount of co-olefin employed is in the range of from 1 to 200 weight %. Where the co-olefin is a gas (such as ethylene) the amount of co-olefin employed is such that it results in a pressure in the reaction vessel in the range of from 1*10⁵ Pa to 1*10⁷ Pa, or in the range of from 5.2*10⁵ Pa to 4*10⁶ Pa.

The metathesis reaction can be carried out in any suitable solvent which does not inactivate the catalyst or otherwise interfere with the reaction. Useful solvents include, but are not limited to, dichloromethane, benzene, toluene, tetrahydrofuran, cylcohexane and the like. For example, the solvent is monochlorobenzene (MCB). In certain cases the co-olefin can itself act as a solvent (for example, 1-hexene), in which case no other solvent is necessary.

The concentration of nitrile polymer (NBR) in the reaction mixture is not critical but, should be such that the reaction is not hampered if the mixture is too viscous to be stirred efficiently. The concentration of NBR is in the range of from 1 to 20% by weight, or, for example, in the range of from 6 to 15% by weight.

The metathesis reaction is carried out at a temperature in the range of from 20 to 140° C.; or, for example, in the range of from 60 to 120° C.

The reaction time will depend upon a number of factors, including cement concentration, amount of catalyst used and the temperature at which the reaction is performed. The metathesis is usually complete within the first two hours under typical conditions. The progress of the metathesis reaction may be monitored by standard analytical techniques, for example using GPC or solution viscosity. Whenever referenced throughout the specification the molecular weight distribution of the polymer was determined by gel permeation chromatography (GPC) using a Waters 2690 Separation Module and a Waters 410 Differential Refractometer running Waters Millenium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

Step 2: Hydrogenation

After the metathesis reaction, the nitrile polymer must be hydrogenated to result in a partially or fully hydrogenated nitrile polymer (HNBR). HNBR are useful in the present invention. Reduction of the product from the metathesis reaction can be effected using standard reduction techniques known in the art. For example, homogeneous hydrogenation catalysts known to those of skill in the art, such as Wilkinson's catalyst {(PPh₃)₃RhCl} and the like can be used.

The hydrogenation may be performed in situ i.e. in the same reaction vessel in which the metathesis step is carried out, without the need to first isolate the metathesised product. The hydrogenation catalyst is simply added to the vessel, which is then treated with hydrogen to produce the HNBR.

Grubb's catalyst, in the presence of hydrogen, is converted to a dihydride complex (PR₃)₂RuCl₂H₂, which is itself an olefin hydrogenation catalyst. Thus, in a favorable one-pot reaction, Grubb's catalyst was used to reduce the molecular weight of NBR in the presence of co-olefin. The reaction mixture was then treated with hydrogen, converting the Grubb's complex to the dihydride species which then hydrogenated the metathesis product to produce the HNBR of the invention. The rate of hydrogenation was lower in this case than in the case where Wilkinson's catalyst was used for the hydrogenation step, but it is clear that such an approach is indeed a viable one.

The low Mooney HNBR which forms a component of the polymer composite of the present invention can be characterized by standard techniques known in the art. For example, the molecular weight distribution of the polymer was determined by gel permeation chromatography (GPC) using a Waters 2690 Separation Module and a Waters 410 Differential Refractometer running Waters Millennium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

The present inventive polymer composite further contains at least one filler. The filler may be an active or an inactive filler or a mixture thereof. The filler may be:

- highly dispersed silicas, prepared e.g. by the precipitation of silicate solutions or the flame hydrolysis of silicon halides, with specific surface areas of in the range of from 5 to 1000 m² μg, and with primary particle sizes of in the range of from 10 to 400 nm; the silicas can optionally also be present as mixed oxides with other metal oxides such as those of Al, Mg, Ca, Ba, Zn; Zr and Ti;
- synthetic silicates, such as aluminum silicate and alkaline earth metal silicate like magnesium silicate or calcium silicate, with BET specific surface areas in the range of from 20 to 400 m²/g and primary particle diameters in the range of from 10 to 400 nm;
- natural silicates, such as kaolin and other naturally occurring silica;
- glass fibers and glass fiber products (matting, extrudates) or glass microspheres;
- metal oxides, such as zinc oxide, calcium oxide, magnesium oxide and aluminum oxide;
- metal carbonates, such as magnesium carbonate, calcium carbonate and zinc carbonate;
- metal hydroxides, e.g. aluminum hydroxide and magnesium hydroxide;
- carbon blacks; the carbon blacks to be used here are prepared by the lamp black, furnace black or gas black process and have preferably BET (DIN 66 131) specific surface areas in the range of from 20 to 200 m²/g, e.g. SAF, ISAF, HAF, FEF or GPF carbon blacks;
- rubber gels, especially those based on polybutadiene, butadiene/styrene copolymers, butadiene/acrylonitrile copolymers and polychloroprene;
- or mixtures thereof.

Examples of useful mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the rubber. For many purposes, the preferred mineral is silica, especially silica made by carbon dioxide precipitation of sodium silicate. Dried amorphous silica particles suitable for use in accordance with the invention may have a mean agglomerate particle size in the range of from 1 to 100 microns, or, for example, between 10 and 50 microns or, further for example, between 10 and 25 microns. According to the present invention, less than 10 percent by volume of the agglomerate particles should be below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil S and Vulkasil N, from Bayer AG.

Often, use of carbon black as a filler is advantageous. Usually, carbon black is present in the polymer composite in an amount of in the range of from 20 to 200 parts by weight, or, for example, 30 to 150 parts by weight, or, further for example, 40 to 100 parts by weight. Further, it might be advantageous to use a combination of carbon black and mineral filler in the present inventive polymer composite. In this combination the ratio of mineral fillers to carbon black is usually in the range of from 0.05 to 20, or, for example, 0.1 to 10.

The polymer composite may advantageously further contain other natural or synthetic rubbers such as BR (polybutadiene), ABR (butadiene/acrylic acid-$C_1$–$C_4$-alkylester-copolymers), CR (polychloroprene), IR (polyisoprene), SBR (styrene/butadiene-copolymers) with styrene contents in the range of 1 to 60 wt %, NBR (butadiene/acrylonitrile-copolymers with acrylonitrile contents of 5 to 60 wt %, HNBR with a Mooney viscosity (ML 1+4 @ 100° C. according to ASTM test D1646) of at least 30 (partially or totally hydrogenated NBR-rubber), EPDM (ethylene/propylene/diene-copolymers), FKM (fluoropolymers or fluororubbers), and mixtures of the given polymers. Careful blending with conventional HNBR often reduces cost of the polymer composite without sacrificing the processability. The amount of conventional HNBR and/or other natural or synthetic rubbers will depend on the process condition to be applied during manufacture of shaped articles and is readily available by few preliminary experiments.

The polymer composite furthermore optionally contains one or more cross-linking agents or curing systems. The present invention is not limited to a special curing system, however, peroxide curing system are preferred. Furthermore, the present invention is not limited to a special peroxide curing system. For example, inorganic or organic peroxides are suitable. Useful organic peroxides include dialkylperoxides, ketalperoxides, aralkylperoxides, peroxide ethers, peroxide esters, such as di-tert.-butylperoxide, bis-(tert.-butylperoxyisopropyl)-benzene, dicumylperoxide, 2,5-dimethyl-2,5-di(tert.-butylperoxy)-hexane, 2,5-dimethyl-2,5-di(tert.-butylperoxy)-hexene-(3), 1,1-bis-(tert.-butylperoxy)-3,3,5-trimethyl-cyclohexane, benzoylperoxide, tert.-butylcumylperoxide and tert.-butylperbenzoate. Usually the amount of peroxide in the polymer composite is in the range of from 1 to 12 phr (per hundred rubber), or, for example, from 4 to 8 phr. Subsequent curing is usually performed at a temperature in the range of from 100 to 200° C., or, for example, 130 to 180 C. Peroxides might be applied advantageously in a polymer-bound form. Suitable systems are commercially available, such as Poly-dispersion T(VC) D40 P from Rhein Chemie Rheinau GmbH, D (polymer-bound di-tert.-butylperoxy-isopropylbenzene).

The rubber composition according to the present invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. According to the present invention, the composition can contain in the range of 0.1 to 20 phr of an organic fatty acid as an auxiliary product, such as a unsaturated fatty acid having one, two or more carbon double bonds in the molecule which more preferably includes 10% by weight or more of a conjugated diene acid having at least one conjugated carbon-carbon double bond in its molecule. For example, those fatty acids have in the range of from 8–22 carbon atoms, or 12–18. Examples include stearic acid, palmitic acid and oleic acid and their calcium-, zinc-, magnesium-, potassium- and ammonium salts. The composition can contain in the range of 5 to 50 phr of an acrylate as an auxiliary product. Suitable acrylates are known from EP-A1-0 319 320, in particular page 3, line 16 to 35, from U.S. Pat. No. 5,208,294, in particular Column 2, line 25 to 40, and from U.S. Pat. No. 4,983,678, in particular Column 2, line 45 to 62. Reference is made to zinc acrylate, zinc diacrylate or zinc dimethacrylate or a liquid acrylate, such as trimethylolpropane-trimethacrylate (TRIM), butanedioldimethacrylate (BDMA) and ethylenglycoldimethacrylate (EDMA). It might be advantageous to use a combination of different acrylates and/or metal salts thereof. Of particular advantage is often to use metal acrylates in combination with a Scorch-retarder such as sterically hindered phenols (e.g. methyl-substituted aminoalkylphenols, such as, 2,6-di-tert.-butyl-4-dimethyl-aminomethylphenol).

The ingredients of the final polymer composite are mixed together, suitably at an elevated temperature that may range from 25° C. to 200° C. Normally the mixing time does not exceed one hour and a time in the range from 2 to 30 minutes is usually adequate. The mixing is suitably carried out in an internal mixer such as a Banbury mixer, or a Haake or Brabender miniature internal mixer. A two-roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (scorch) occurs during the mixing stage. For compounding and vulcanization see also: Encyclopedia of Polymer Science and Engineering, Vol. 4, p. 66 et seq. (Compounding) and Vol. 17, page 666 et seq. (Vulcanization).

Due to the low viscosity of the polymer composite, the polymer composite is ideally suited to be processed by but not limited to molding injection technology. The polymer composite can also be useful to transfer molding, to compression molding, or to liquid injection molding. The polymer composite containing a cross-linking system is usually introduced in a conventional injection molding and injected into hot (about 160–230° C.) forms where the cross-linking/vulcanization takes place depending on the polymer composite composition and temperature of the mold.

The present inventive polymer composite is very well suited for the manufacture of a shaped article, such as a seal, hose, bearing pad, stator, well head seal, valve plate, cable sheathing, wheel, roller, pipe seal, in place gaskets or footwear component prepared by injection molding technology.

EXAMPLES

Examples 1–4

Bis(tricyclohexylphosphine)benzylidene ruthenium dichloride (Grubb's metathesis catalyst), 1-hexene and monochlorobenzene (MCB) were purchased from Alfa, Aldrich Chemicals, and PPG respectively and used as received.

The metathesis reactions were carried out in a Pilot high-pressure reactor under the following conditions:

| | |
|---|---|
| Cement Concentration | 6% by weight |
| Co-Olefin | Ethylene |
| Co-Olefin Concentration | 500 psi |
| Agitator Speed | 600 rpm |
| Catalyst Loading | See Table 1 |
| Solvent | Monochlorobenzene |
| Perbunan | statistical Butadiene-acrylonitrilecopolymer with an acrylonitrile content of 34 mol % and a Mooney-Viscosity ML (1 + 4) @ 100° C. of 30 MU. |

The polymer (9 kg) was dissolved in monochlorobenzene (141 kg). The reactor was heated to desired temperature and 2 L of a monochlorobenzene solution containing Grubb's catalyst was added to the reactor. The reactor was pressurized with ethylene to a pressure of 500 psi. The temperature was maintained constant for the duration of the reaction. A cooling coil connected to a temperature controller and a thermal sensor was used to regulate the temperature. The progress of the reaction was monitored using solution viscosity measurements for the 6% cements.

The hydrogenation reactions were carried out in the same reactor as the metathesis under the following conditions:

| | |
|---|---|
| Cement solid concentration | 12% |
| H2(g) pressure | 1200 psi |
| Agitator Speed | 600 rpm |
| Reactor Temperature | 138° C. |
| Catalyst Loading (Wilkinson's) | See Table 1 |
| Triphenylphosphine | 1 phr |
| Solvent | Monochlorobenzene |

The cement from the metathesis reaction was degassed 3 times with H2 (100 psi) under full agitation. The temperature of the reactor was raised to 130° C. and a 2L monochlorobenzene solution containing Wilkinson's catalyst and triphenylphosphine was added to the reactor. The temperature was allowed to increase to 138° C. and maintained constant for the duration of the reaction. The hydrogenation reaction was monitored by measuring the residual double bond (RDB) level at various intervals using IR spectroscopy.

Alternatively, the Ruthenium metathesis catalyst could be used to hydrogenate the polymer.

TABLE 1

| | Raw Polymer Properties | | | |
|---|---|---|---|---|
| | Therban ® A3407 as comparison | Therban ® C3467 as comparison | Therban ® A3907 as comparison | Therban ® C4307 as comparison |
| Wilkinson's Loading | N/A | N/A | N/A | N/A |
| ML (1 + 4) @ 100° C.) | 70 | 70 | 70 | 70 |
| RDB (by IR) | <0.9% | 5.5% | <0.9% | <0.9% |
| Mn | 97000 | 95000 | 97000 | 87000 |
| Mw | 314000 | 301000 | 298000 | 290000 |
| PDI | 3.2 | 3.2 | 3.1 | 3.3 |
| | Ex. 1 | Ex. 2 | Ex. 3 | Ex. 4 |
| Grubb's Loading | | | | |
| Wilkinson's Loading | 0.08 phr | 0.05 phr | 0.08 phr | 0.08 phr |

TABLE 1-continued

Raw Polymer Properties

| | | | | |
|---|---|---|---|---|
| ML (1 + 4 @ 100° C.) | 38.3 | 32.5 | 39.7 | 34.1 |
| RDB (by IR) | <0.9% | 5.5% | <0.9% | <0.9% |
| Mn | 70000 | 72000 | 70000 | 67000 |
| Mw | 197000 | 172000 | 186000 | 184000 |
| PDI | 2.8 | 2.4 | 2.7 | 2.8 |

EXAMPLES 5–6

Compounding and Physical Testing in Peroxide Recipe

Polymer composites were mixed on an open mill. The curatives were added on a cold open mill in a separate mixing step. The formulations used in this assessment are based on a simplified peroxide recipe according to Table 2.

Carbon black N 660 Sterling-V available from Cabot Tire Blacks

Maglite® D is a MgO available from C.P. Hall.

Naugard® 445 is a diphenylamine available from Uniroyal Chemical.

Plasthall TOTM is a Trioctyl trimellitate available from C.P. Hall.

Vulkanox® ZMB-2/C5 is a Zinc salt of 4- and 5-methyl-mercapto benzimidazole available from Bayer AG DIAK #7 is a Triallylisocyanurate available from DuPont Dow Elastomers Vulcup 40KE is 2,2'-bis(tert-butylperoxy di-isopropyl-benzene) available from Harwick Standard.

TABLE 2

Compounding Recipe

| | Experiment | |
|---|---|---|
| | 5 (comp.) | 6 |
| Therban ® A3407 | 100 | |
| HNBR of Example 1 | | 100 |
| Carbon Black, N 660 Sterling-V | 50 | 50 |
| Maglite ® D | 3 | 3 |
| Naugard ® 445 | 1 | 1 |
| Vulkanox ® ZMB-2/C5 (ZMMBI) | 0.4 | 0.4 |
| Zinc Oxide (Kadox ® 920) Grade PC 216 | 3 | 3 |
| DIAK #7 | 1.5 | 1.5 |
| Vulcup 40KE | 7.5 | 7.5 |

Polymer Composites Properties

Table 3 shows a summary of the properties of polymer composites of Exp. 5 and 6. Example 5 is for comparison. The MDR cure characteristics were at 1.7 Hz, 1° arc, 180° C., 30 min, 100 dNm.

TABLE 3

Summary of Polymer Composites Properties

| | Example | |
|---|---|---|
| | 5 | 6 |
| Mooney ML 1 + 4 @ 100° C. | | |
| Raw Polymer | 70 | 38 |
| Polymer composite | 105 | 67 |

TABLE 3-continued

Summary of Polymer Composites Properties

| | Example | |
|---|---|---|
| | 5 | 6 |
| MH (dN.m) | 57.6 | 47.4 |
| ML (dN.m) | 3.2 | 1.6 |
| Delta Torque (dN · m) | 54.5 | 45.8 |
| t90 (minutes) | 5.9 | 6.3 |
| 100% Modulus (Mpa) | 8.7 | 7.9 |
| Ultimate Tensile (Mpa) | 23.8 | 23.3 |
| Elongation at Break (%) | 188 | 212 |
| Hardness Shore A | 70 | 68 |
| Compression Set in % after 168 h @ 150° C. | 22.88 | 24.24 |

From Table 3, it is clear that although the molecular weight (Mw) of the Low Mooney HNBR used in polymer composite 6 is only 63% of that of Therban® A3407, the physical properties remain very good. In order to investigate the suitability for injection molding, a series of experiments were done at various pressures on a capillary PV 400 Rheovulcameter. The testing method is described in Intern. Polymer Processing III (1988) 2, pp. 86–90.

The results are given in Table 4.

TABLE 4

Pressure vs. Filling Degree

| Pressure | Filling Degree (%) for Composite 5 | Filling Degree (%) for Composite 6 |
|---|---|---|
| 50 bar | 4.9 | 10.9 |
| 75 bar | 11.2 | 24.6 |
| 95 bar | 21.4 | 43 |

The excellent physical properties of such a low molecular weight polymer might be attributed to the narrow molecular weight distribution. The low molecular weight which is supported by a narrower MWD result in a favorable viscosity, which allows for injection molding processes for producing shaped articles with about the double speed compared to regular HNBR.

EXAMPLES 7–10

Compounding and Physical Testing in Sulfur Recipe

Polymer composites were mixed on an open mill. The curatives were added on a cold open mill in a separate mixing step. The formulations used in this assessment are based on a simplified sulfur recipe according to Table 5.

Carbon black N 660 Sterling-V available from Cabot Tire Blacks.

Naugard® 445 is a diphenylamine available from Uniroyal Chemical.

Vulkanox® ZMB-2/C5 is a Zinc salt of 4- and 5-methyl-mercapto benzimidazole available from Bayer AG Vulkacit CZ/EG-C is a benzothiazyl-2-cyclohexyl sulfe-namide available from Bayer AG.

Vulkacit Thiuram/C is a tetramethylthirum disulfide available from Bayer AG.

Spider Sulfur is elemental sulfur available from C.P. Hall.

TABLE 5

Compounding Recipe

| | Experiment | | | |
|---|---|---|---|---|
| | 7 (comp.) | 8 | 9 | 10 |
| Therban ® C3467 | 100 | 70 | 30 | 0 |
| HNBR of Example 3 | 0 | 30 | 70 | 100 |
| Carbon Black, N 660 Sterling-V | 50 | 50 | 50 | 50 |
| Stearic Acid Emersol 132 NF | 1 | 1 | 1 | 1 |
| Naugard ® 445 | 1 | 1 | 1 | 1 |
| Vulkanox ® ZMB-2/C5 (ZMMBI) | 0.4 | 0.4 | 0.4 | 0.4 |
| Zinc Oxide (Kadox 920) Grade PC 216 | 3 | 3 | 3 | 3 |
| Spider Sulfur | 0.5 | 0.5 | 0.5 | 0.5 |
| Vulkacit ® CZ/EG-C (CBS) | 0.5 | 0.5 | 0.5 | 0.5 |
| Vulkacit ® Thiuram/c (D) | 2 | 2 | 2 | 2 |

Polymer Composites Properties

Table 6 shows a summary of the properties of polymer composites of Exp. 7–10. Example 7 is for comparison. The MDR cure characteristics were at 1.7 Hz, 1° arc, 170° C., 30 min, 100 dNm.

TABLE 6

Summary of Polymer Composites Properties

| | Example | | | |
|---|---|---|---|---|
| | 7 | 8 | 9 | 10 |
| Mooney ML 1 + 4 @ 100° C. | | | | |
| Raw Polymer | 70 | | | 32.5 |
| Polymer composite | 90.9 | 84.1 | 68.2 | 56.0 |
| MH (dN · m) | 44.4 | 44.2 | 41.7 | 36.2 |
| ML (dN · m) | 2.5 | 2.3 | 1.5 | 1.0 |
| Delta Torque (dN · m) | 41.9 | 42 | 40.2 | 35.2 |
| T90 (minutes) | 2.8 | 2.9 | 3.3 | 3.9 |
| 100% Modulus (Mpa) | 3.9 | 4.1 | 3.9 | 3.5 |
| Ultimate Tensile (Mpa) | 23.97 | 2448 | 23.75 | 22.27 |
| Elongation at Break (%) | 440 | 456 | 487 | 512 |
| Hardness Shore A | 68 | 68 | 66 | 66 |
| Compression Set in % after 168 h @ 150° C. | 66.27 | 62.72 | 64.38 | 69.63 |

EXAMPLES 11–12

Compounding and Physical Testing in Blends with Levapren®

Table 7 shows a summary of the properties of polymer composites of Exp. 11–12. Example 11 is for comparison. The MDR cure characteristics were at 1.7 Hz, 1° arc, 180° C., 30 min, 100 dNm.

Levapren® 700 HV is a 70% vinyl acetate/ethylene copolymer available from Bayer AG.

TABLE 7

Compounding Recipe

| | Experiment | |
|---|---|---|
| | 11 (comp.) | 12 |
| Therban ® A3407 | 70 | |
| HNBR of Example 3 | | 70 |
| Levapren ® 700 HV | 30 | 30 |

TABLE 7-continued

Compounding Recipe

| | Experiment | |
|---|---|---|
| | 11 (comp.) | 12 |
| Carbon Black, N 660 Sterling-V | 50 | 50 |
| Maglite ® D | 3 | 3 |
| Naugard ® 445 | 1 | 1 |
| Plasthall ® TOTM | 5 | 5 |
| Vulkanox ® ZMB-2/C5 (ZMMBI) | 0.4 | 0.4 |
| Zinc Oxide (Kadox ® 920) Grade PC 216 | 3 | 3 |
| DIAK #7 | 1.5 | 1.5 |
| Vulcup 40KE | 7.5 | 7.5 |

Polymer Composites Properties

TABLE 8

Summary of Polymer Composites Properties

| | Example | |
|---|---|---|
| | 11 | 12 |
| Mooney ML 1 + 4 @ 100° C. | | |
| Raw Polymer (HNBR) | 69 | 40 |
| Raw Polymer (Levapren H 700 HV) | 27 | 27 |
| Polymer composite | 66 | 46 |
| MH (dN.m) | 54 | 48.3 |
| ML (dN.m) | 2.4 | 1.5 |
| Delta Torque (dN.m) | 51.5 | 46.8 |
| t90 (minutes) | 5.4 | 5.6 |
| 100% Modulus (Mpa) | 10.4 | 9.9 |
| Ultimate Tensile (Mpa) | 24 | 23.9 |
| Elongation at Break (%) | 181 | 196 |
| Hardness Shore A | 71 | 69 |
| Compression Set in % after 168 h @ 150° C. | 20.76 | 25.04 |

EXAMPLES 13–16

Compounding and Physical Testing in Blends with a Commercially Available HNBR with an ACN content of 39 mol %

Table 9 shows a summary of the properties of polymer composites of Exp. 13–16. Example 13 is for comparison. The MDR cure characteristics were at 1.7 Hz, 1° arc, 180° C., 30 min, 100 dNm.

TABLE 9

Compounding Recipe

| Experiment | 13 | 14 | 15 | 16 |
|---|---|---|---|---|
| Therban ® A3907 | 100 | 85 | 70 | 50 |
| HNBR of Example 3 | | 15 | 30 | 50 |
| Carbon Black, N 660 Sterling-V | 50 | 50 | 50 | 50 |
| Maglite ® D | 3 | 3 | 3 | 3 |
| Naugard ® 445 | 1.1 | 1.1 | 1.1 | 1.1 |
| Vulkanox ® ZMB-2/C5 (ZMMBI) | 0.4 | 0.4 | 0.4 | 0.4 |
| Zinc Oxide (Kadox ® 920) | 3 | 3 | 3 | 3 |
| DIAK #7 | 1.5 | 1.5 | 1.5 | 1.5 |
| Vulcup 40KE | 7.5 | 7.5 | 7.5 | 7.5 |

TABLE 10

Summary of Polymer Composites Properties

| Example | 13 | 14 | 15 | 16 |
|---|---|---|---|---|
| Mooney ML 1 + 4@100° C. | | | | |
| Polymer composite | 98 | 91 | 81 | 70 |
| MH (dN · m) | 49.3 | 48.2 | 46.4 | 44.9 |
| ML (dN · m) | 2.6 | 2.4 | 2.1 | 1.9 |
| Delta Torque (dN · m) | 46.7 | 45.8 | 44.3 | 43.1 |
| t90 (minutes) | 5.6 | 5.7 | 5.9 | 6.1 |
| 100% Modulus (Mpa) | 7.45 | 7.09 | 7.01 | 6.51 |
| Ultimate Tensile (Mpa) | 25.0 | 25.5 | 24.4 | 24.8 |
| Elongation at Break (%) | 235 | 255 | 232 | 261 |
| Hardness Shore A | 67 | 67 | 66 | 64 |
| Compression Set in % after 168 h @ 150° C. | 22.1 | 24.5 | 23.1 | 24.5 |

EXAMPLES 17–20

Compounding and Physical Testing in Blends with a Commercially Available HNBR with an ACN Content of 43 mol %

Table 11 shows a summary of the properties of polymer composites of Exp. 17–20. Example 17 is for comparison. The MDR cure characteristics were at 1.7 Hz, 1° arc, 180° C., 30 min, 100 dNm.

TABLE 11

Compounding Recipe

| Experiment | 17 | 18 | 19 | 20 |
|---|---|---|---|---|
| Therban ® A4307 | 100 | 85 | 70 | 50 |
| HNBR of Example 3 | | 15 | 30 | 50 |
| Carbon Black, N 660 Sterling-V | 50 | 50 | 50 | 50 |
| Maglite ® D | 3 | 3 | 3 | 3 |
| Naugard ® 445 | 1.1 | 1.1 | 1.1 | 1.1 |
| Vulkanox ® ZMB-2/C5 (ZMMBI) | 0.4 | 0.4 | 0.4 | 0.4 |
| Zinc Oxide (Kadox ® 920) | 3 | 3 | 3 | 3 |
| DIAK #7 | 1.5 | 1.5 | 1.5 | 1.5 |
| Vulcup 40KE | 7.5 | 7.5 | 7.5 | 7.5 |

TABLE 12

Summary of Polymer Composites Properties

| Example | 17 | 18 | 19 | 20 |
|---|---|---|---|---|
| Mooney ML 1 + 4@100° C. | | | | |
| Polymer composite | 86 | 85 | 75 | 67 |
| MH (dN · m) | 43.7 | 44.2 | 43.4 | 42.9 |
| ML (dN · m) | 1.7 | 2.0 | 1.9 | 1.7 |
| Delta Torque (dN · m) | 42 | 42.2 | 41.6 | 41.2 |
| t90 (minutes) | 6.3 | 6.1 | 6.1 | 6.3 |
| 100% Modulus (Mpa) | 7.75 | 7.31 | 6.37 | 6.86 |
| Ultimate Tensile (Mpa) | 25.4 | 25.7 | 24.8 | 24.1 |
| Elongation at Break (%) | 248 | 279 | 272 | 260 |
| Hardness Shore A | 67 | 67 | 66 | 65 |
| Compression Set in % after 168 h @ 150° C. | 24.3 | 23.1 | 23.4 | 23.4 |

EXAMPLES 21–22

Compounding and Physical Testing in a White Formulation

Table 13 shows a summary of the properties of polymer composites of Exp. 21–22. Example 21 is for comparison. The MDR cure characteristics were at 1.7 Hz, 1° arc, 180° C., 30 min, 100 dNm.

Hi-Sil® 233 is a precipitated hydrated amorphous silica available from Harwick Standard.

Silane A-174 DLC is a coupling agent available from Harwick Standard.

Satintone® SP-33 Kaolin Clay is available from Engelhard.

Aflux® 54 is a pentaerythriltetrastearate available from Rhein Chemie.

Saret® 517 is a coagent available from Sartomer.

TP-95® is a di(butoxy-ethoxy-ethyl) adipate available from Morton International.

Kronos® (Titanox) 1000 is a available from Kronos Titan.

TAIC-DLC-A is a triallyl isocyanurate.

TABLE 13

Compounding Recipe

| Experiment | 21 | 22 |
|---|---|---|
| Therban ® A3406 | 100 | |
| HNBR of Example 4 | | 100 |
| Hi-SIL ® 233 | 25 | 25 |
| Silane A-174 DLC | 1.5 | 1.5 |
| Satintone ® SP-33 Kaolin Clay | 30 | 30 |
| Aflux ® 54 | 2 | 2 |
| Saret ® 517 | 2 | 2 |
| TP-95 ® | 20 | |
| Kronox ® (Titanox) 1000 | 2 | 2 |
| Maglite ® D | 5 | 5 |
| Naugard ® 445 | 1.1 | 1.1 |
| Stearic Acid Emersol 132 NF | 0.5 | 0.5 |
| Vulkanox ® ZMB-2/C5 (ZMMBI) | 0.4 | 0.4 |
| Zinc Oxide (Kadox ® 920) | 5 | 5 |
| TAIC-DLC-A | 5.12 | 5.12 |
| Vulcup 40KE | 10 | 11 |

TABLE 14

Summary of Polymer Composites Properties

| Example | 21 | 22 |
|---|---|---|
| Mooney ML 1 + 4@100° C. | | |
| Polymer composite | 44.7 | 49.7 |
| MH (dN · m) | 55.4 | 86 |
| ML (dN · m) | 1.6 | .6 |
| Delta Torque (dN · m) | 53.7 | 84.4 |
| t90 (minutes) | 4.6 | 4.6 |
| Stress-Strain (unaged) | | |
| 100% Modulus (Mpa) | 6.6 | 13 |
| Ultimate Tensile (Mpa) | 14.4 | 16.1 |
| Elongation at Break (%) | 222 | 132 |
| Hardness Shore A | 70 | 80 |
| Stress-Strain (Aged @ 150° C. 168 h, hot air) | | |
| 100% Modulus (Mpa) | 13.4 | 20 |
| Ultimate Tensile (Mpa) | 19.5 | 21.3 |
| Elongation at Break (%) | 173 | 106 |
| Hardness Shore A | 82 | 83 |
| Change in stress @ 100 (%) | 104 | 54 |

TABLE 14-continued

Summary of Polymer Composites Properties

| Example | 21 | 22 |
|---|---|---|
| Chg. Ulti. Tens. (%) | 35 | 32 |
| Chg. Elong. Brk (%) | −22 | −20 |
| Chg. Hard. Shore A (pts) | 12 | 3 |

From Table 14, it is clear that when compounded to the same compound Mooney Viscosity, the Low Mooney HNBR used in composite 22 can be used without plasticizer. This result in equal processing and improved unaged physical properties.

The lower plasticizer level leads to improved Compressive Stress Relaxation (CSR) which translate to and improved retention of Initial Force as shown in FIG. 1: "Compressive Stress Relaxation 25% Compressive Strain, 150° C.".

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polymer composite consisting of at least one, optionally hydrogenated, nitrile rubber polymer having a Mooney viscosity (ML 1+4 @ 100° C.) in the range of from 50–30 and a polydispersity index of less than 2.7, at least one filler and optionally at least one cross-linking agent, wherein the optionally hydrogenated, nitrile rubber polymer is prepared by a metathesis reaction in the presence of one or more compounds of the general formulas I, II, III or IV

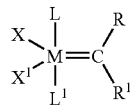

Formula I wherein:

M is Os or Ru,

R and $R^1$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, X and $X^1$ are independently any anionic ligand, and L and $L^1$ are independently any neutral ligand or any neutral carbene, optionally, L and $L^1$ can be linked to one another to from a bidentate neutral ligand;

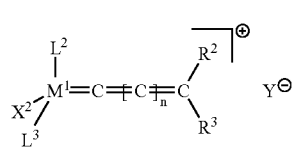

Formula II wherein:

$M^1$ is Os or Ru;

$R^2$ and $R^3$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy $_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, $X^2$ is anionic ligand, and $L^2$ is a neutral π-bonded ligand, independent of whether is mono- or polycyclic, $L^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxylcarbonylalkyl-, hydrocycarbonylalkyl-, hydroxyalkyl- or ketoalkyl- groups, phosphites, phosphinites, phosphonites, phophinamines, arsines, stibenes, ethers, amines, amides, imines, sulfoxides, thioethers and pyridines, Y- is a non-coordinating anion, n is an integer in the range of from 0 to 5;

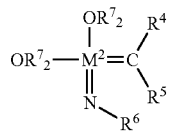

Formula III wherein $M^2$ is Mo or W, $R^4$ and $R^5$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkyrlthio, $C_1$–$C_{20}$ alkylsulfonyl and $C_1$–$C_{20}$ alkylsulfinyl, $R^6$ and $R^7$ are independently selected from any unsubstituted or halo-substituted alkyl, aryl, aralkyl groups or silicon-containing analogs thereof:

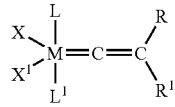

Formula IV wherein:

M is Os or Ru,

R and $R^1$ are independently selected from the group consisting of hydrogen, substituted or unsubstituted alkyl, and substituted or unsubstituted alkyl, X and $X^1$ are independently any anionic ligand, and L and $L^1$ are independently any neutral ligand, or any neutral carbene, optionally, L and $L^1$ can be linked to one another to form a bidentate neutral ligand.

2. The polymer composite according to claim 1 wherein the Mooney viscosity (ML 1+4 @ 100° C.) is in the range of from 45–30.

3. The polymer composite according to claim 1 wherein the Mooney viscosity (ML 1+4 @ 100° C.) is in the range of from 40–30.

4. The polymer composite according to claim 1, wherein the optional cross-lining agent is selected peroxide or sulfur curing system.

5. A process for preparing the polymer composite according claim 1 comprising mixing the least one, optionally hydrogenated, nitrile rubber polymer having a Mooney viscosity (ML 1+4 @ 100° C.) in the range of from 50–30 and a polydispersity index of less than 2.7, the at least one filler and optionally the at least one cross-linking agent.

6. A process for the manufacture of a shaped article comprising the step of injection molding a polymer composite according to claim 1.

7. The process according to claim 6, wherein the shaped article is a seal, a hose, a beating pad, a stator, a well head seal, a valve plate, a cable sheathing, a wheel roller, a belt, in place gaskets or a pipe seal.

* * * * *